Oct. 31, 1939.　　　　　E. ROSS　　　　　2,177,788
FILM MARKING DEVICE
Filed Sept. 14, 1934　　　3 Sheets-Sheet 1
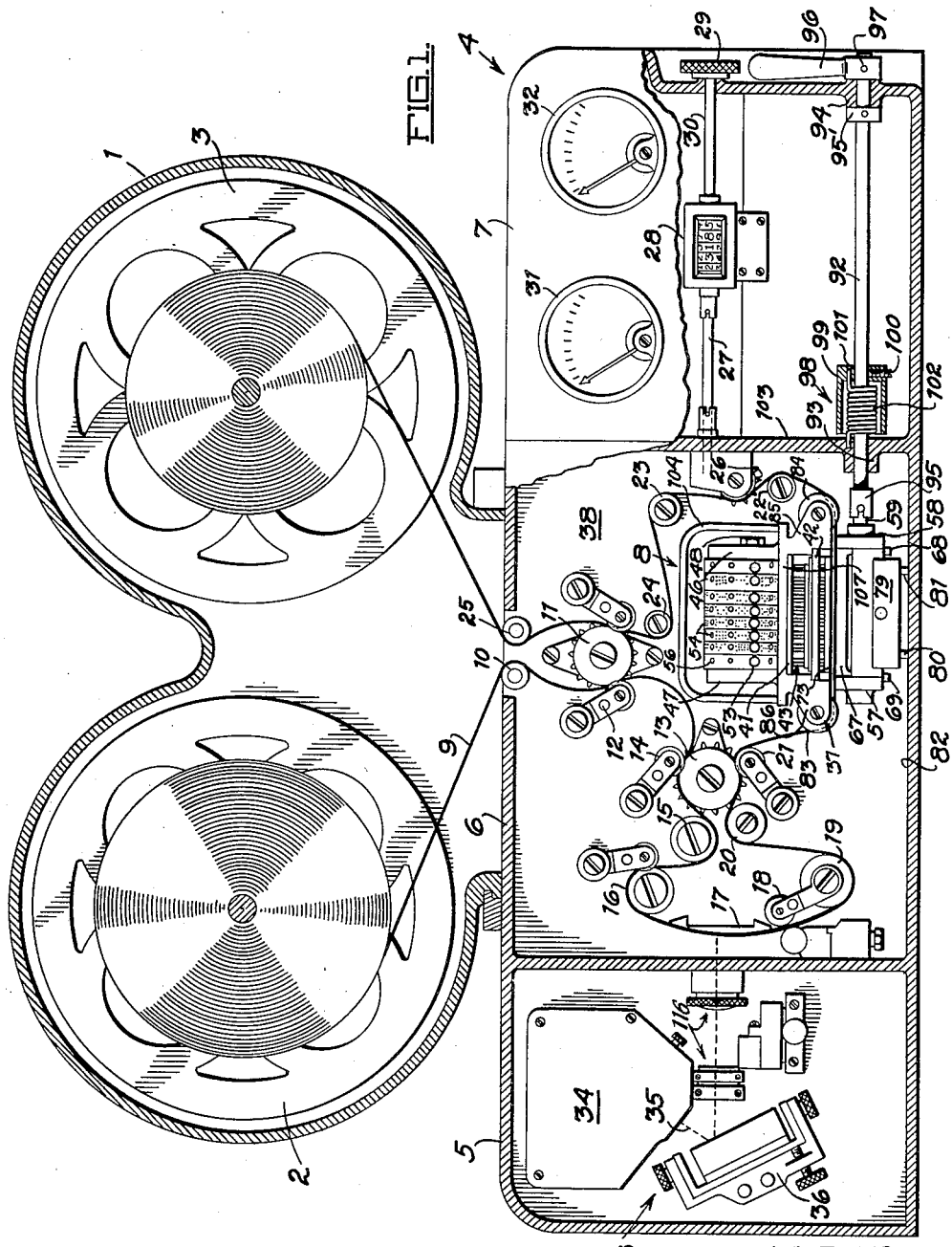
INVENTOR
Ernest Ross
BY
W E Beatty
ATTORNEY Oct. 31, 1939.  E. ROSS  2,177,788
FILM MARKING DEVICE
Filed Sept. 14, 1934   3 Sheets-Sheet 2
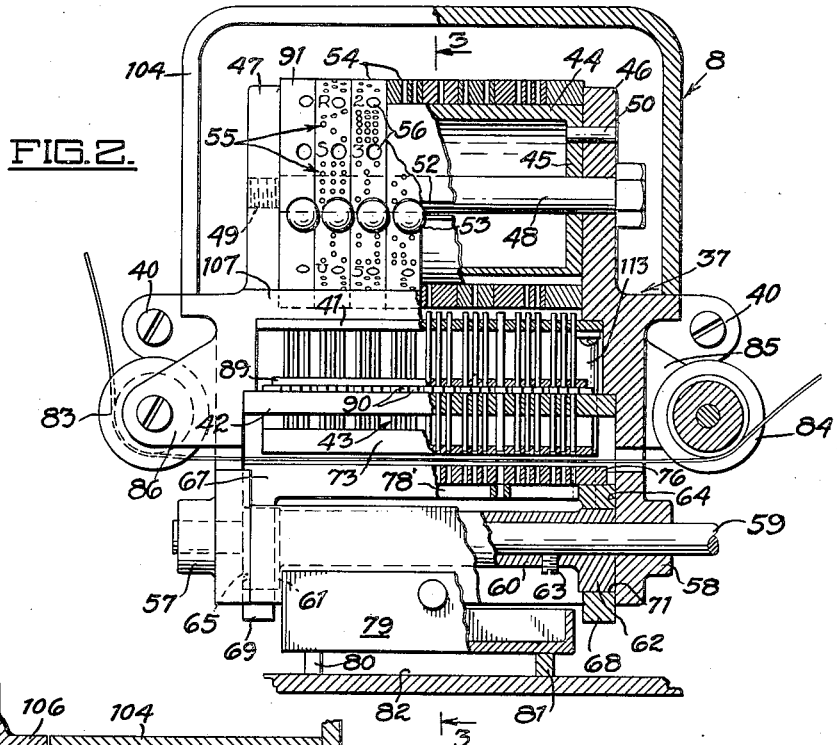
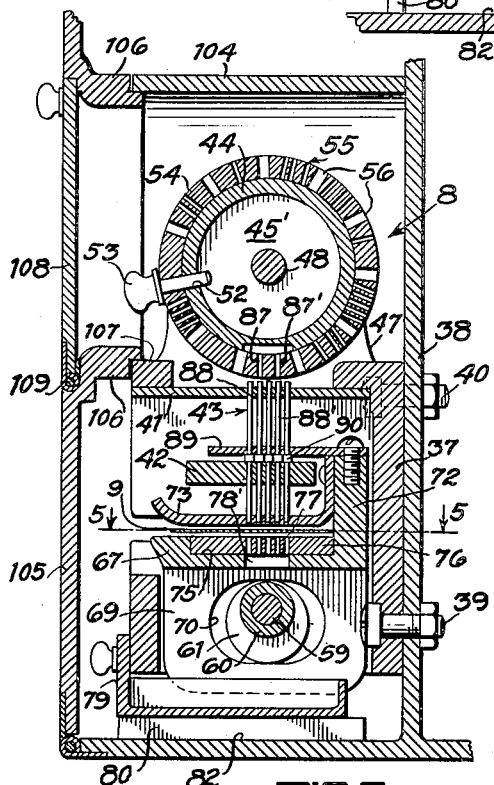
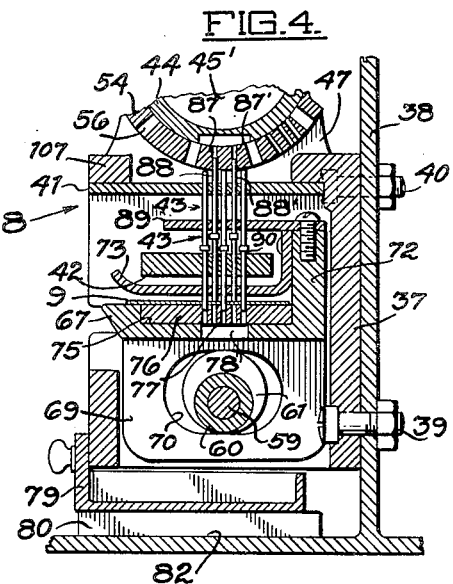
INVENTOR
Ernest Ross
BY W. E. Beatty
ATTORNEY Oct. 31, 1939.  E. ROSS  2,177,788
FILM MARKING DEVICE
Filed Sept. 14, 1934  3 Sheets-Sheet 3
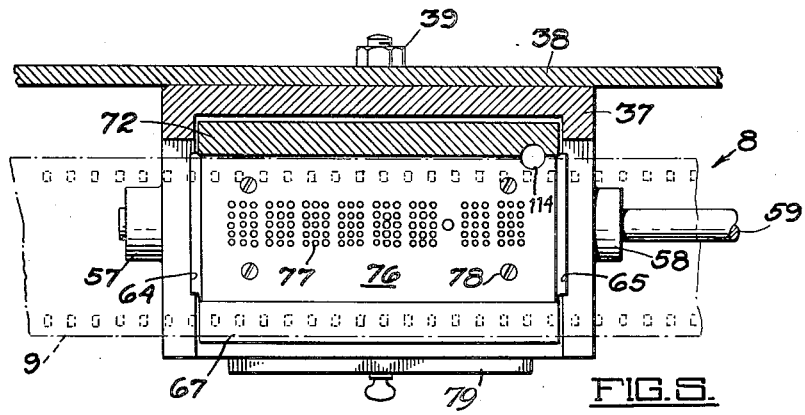
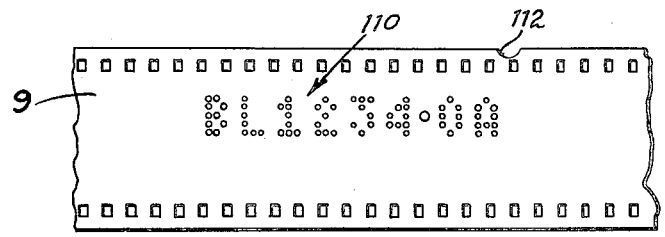
INVENTOR
Ernest Ross
BY
W A Beatty
ATTORNEY Patented Oct. 31, 1939

2,177,788

UNITED STATES PATENT OFFICE 2,177,788

FILM MARKING DEVICE

Ernest Ross, Richmond Hill, N. Y., assignor, by mesne assignments, to Radio Corporation of America, New York, N. Y., a corporation of Delaware Application September 14, 1934, Serial No. 743,973

8 Claims. (Cl. 164—111)

The invention relates to a film marking device and has for an object to enable the operator of a sound film recorder to punch the film at the beginning of a take or otherwise with a letter or number combination to identify the name of the picture, the number of the scene, and the number of the take in that scene.

Preferably the film marking device or punch is mounted in the recorder, means being provided whereby it is only necessary to operate the punch once to record all of the data required at that time. This has the advantage of saving time over the prior practice according to which a separate hand punch was employed for each letter or number.

In the case where sound and picture are recorded on separate films, the film punch of this invention may be used in the sound recorder, whereas the picture camera may still be operated in conjunction with the usual slate and clapper stick.

In the case where sound and picture are recorded on the same film, the film punch of this invention may be incorporated in the sound camera, thereby making it unnecessary to use the slate and clapper stick with a consequent saving of time, film, and annoyance to the actors, whose temperamental moods are frequently disturbed by the sound of the clapper stick. Also, the takes to be discarded can be readily identified.

The invention provides a film punch which is adjustable whereby any desired letter and/or number combination can be set up to correspond to a pre-arranged code for identifying the required data such as the name of the picture, and also the scene and take number.

A further object of the invention is to provide access to the changeable discs of the film punch for changing the letter or number combination thereon, without exposing any of the film in the camera or any other strip affectable by light. This is accomplished by mounting the film punch in a small light tight compartment; the changeable discs being accessible from the exterior of the recording machine without opening the main door of the recorder which would expose a part or all of the light-affectable strip.

For further details of the invention reference may be made to the drawings wherein:

Fig. 1 is a vertical sectional view of a sound recording apparatus in which is enclosed a preferred form of film marking device.

Fig. 2 is an elevational view, partly in section, showing a preferred form of film marking device.

Fig. 3 is a vertical sectional view taken on the line 3—3 of Fig. 2.

Fig. 4 is a view similar to that of Fig. 3, with parts broken away, showing the device in a different position.

Fig. 5 is a view taken on line 5—5 of Fig. 3.

Fig. 6 is a view showing a section of film having on it identification markings made by the marking device.

More particularly describing my invention, a film magazine houses a supply reel 2, and a take-up reel 3. The film magazine 1 is placed on top of a conventional sound recording box generally indicated by reference numeral 4, which is shown as comprising three separate compartments 5, 6, and 7, respectively. In the lower right hand corner of the main sound mechanism compartment 6 is mounted my preferred form of film marking device generally indicated at 8 which I will more particularly describe hereafter.

The film 9 is shown as being fed from the supply reel 2, down over a free roller 10 and thence down over a main drive sprocket 11 which also serves to pass the film, after it has gone through the sound apparatus, back to the take-up reel 3. A conventional spring pressed guide roller 12 guides the film 9 onto the sprocket 11. From the main drive sprocket 11 the film 9 passes down over a second drive sprocket 13, having a guide roller 14, and thence over a pair of free rollers 15 and 16, down past the sound gate 17 where the sound track is recorded on it. From the sound gate 17 the film passes under a tension member 18 which is provided so as to keep a constant and even tension on the film as it goes past the sound gate 17. From here the film 9 travels under a free roller 19, up over another roller 20 and back under the drive sprocket 13 having a guide roller 21. The film 9 then passes through the marking device 8, thence up over a set of free rollers 22, 23, and 24, respectively, and finally over the main drive sprocket 11, up over the free roller 25 and over to the take-up reel 3.

Interposed between the free rollers 22 and 23 I provide a film driven sprocket 26, which drives a shaft 27, to operate a conventional film footage counter 28 placed in the rear compartment 7. In order to reset the counter at the end of a reel of film or whenever necessary I provide a knob 29 placed outside of the compartment and which operates the counter through the shaft 30. Suitable meters 31 and 32 are used in conjunction with a suitable sound recording circuit not shown, and connected to the light beam modulating apparatus in compartment 5. While any conventional light beam modulating apparatus may be employed, I show, for the purpose of illustration, the apparatus generally indicated at 33 which comprises a light source mounted in a container 34. A light beam 35 is projected from the light source to a mirror of a galvanometer 36 from whence it is reflected through a suitable optical system 116 onto the film 9.

More particularly describing my preferred form of film marking device, which is shown in detail in Figs. 2–5, I provide a main frame 37 38 formed within the main compartment 6. Bolts 38 formed wthin the main compartment 6. Bolts 39 and 40 are used to fasten the main frame 37 onto the wall 38.

Mounted in recesses between the two ends of the main frame 37, I provide an upper and lower guide block 41 and 42, respectively, held in the recesses as by frictional engagement. Each of these guide blocks has a plurality of holes in which are loosely mounted punches or pins 43. A cylindrical shell 44, having closed ends 45 and 45′, is mounted between a pair of brackets 46 and 47 formed integrally with the upper part of the frame 37. The shell 44 is held in position by an axially extending bolt 48 which extends through the bracket 46 and is held in threaded engagement with the bracket 47 as indicated at 49. In order to hold the shell 44 against rotation, I provide a dowel pin 50 placed through the bracket 46 and the end 45 of the shell 44. At the front of the shell 44 is a longitudinal slot 52 adapted to receive the ends of index pins 53. I provide a plurality of annular rings 54 mounted on the periphery of the shell 44 and in sliding engagement therewith. As will be seen from Fig. 2, the rings 54 are divided into sections each having a pattern of holes 55 and also an indexing hole 56 through which the indexing pins 53 are inserted.

The lower ends of the frame 37 are provided with a set of bearings 57 and 58 through which extends an operating shaft 59. Between the bearings 57 and 58 I provide a sleeve member 60 having cam surfaces 61 and 62 formed on either end thereof. The sleeve member 60 may be fastened to the shaft 59 by any suitable means such as a set screw 63. Mounted in vertical guideways 64 and 65 in the frame 37 is a reciprocating die member 67 shown as being provided at opposite ends with downwardly extending flanges 68 and 69. The flanges 68 and 69 are provided with elliptical cam slots 70 and 71 which are engaged by the cam surfaces 61 and 62, respectively, of the sleeve member 60. It will be seen that by rotating the shaft 59, the reciprocation of the die member 67 may thereby be effected. At the rear of the die member 67 is formed a ledge 72 on which a stripper plate 73 is mounted. The bed of the die member 67 is recessed as at 75 in which is secured a die plate 76 having a plurality of dies 77 which register with the punches or pins 43. Screws 78 hold the die plate 76 in position on the die member 67. Below the die plate 76, the die member 67 is provided with a slot 78′ to allow the punchings to fall through onto a tray 79. This tray is shown as being slidably mounted on guides 80 and 81 fastened to the bottom floor 82 and is removable to enable the punchings to be discharged whenever necessary.

A pair of rollers 83 and 84 are mounted in brackets 85 and 86 integrally formed on the frame 37 on opposite sides thereof. These rollers 83 and 84 guide the film through the device between the die plate 76 and the stripper plate 73. As was pointed out before, the annular rings 54 are divided into sections, each having a pattern of holes, the purpose of which will be seen more clearly in Figs. 3 and 4. In this particular case, two of the holes 87 and 87′ are shown as registering with two of the punches or pins 88 and 88′, respectively. When the die member is raised by rotation of the shafts 59, it will be seen that the pins 88 and 88′ will be pushed through the holes 87 and 87′ while remaining punches are held against upward movement by the outer surface of the ring 54 thereby perforating the film as seen in Fig. 4. In order to avoid the possibility of any of the pins such as 88 and 88′ sticking in the holes 87 and 87′ when the die member 67 is returned to its original position, I provide a plate 89 mounted on the top of the ledge 72 of the die member 67. On the downward stroke of the die member 67, the plate 89 strikes the tops of the enlarged portions 90 of the pins 88 and 88′, pulling them down into position. In some cases, where a certain numeral or letter of a combination is not required to be indexed, as for example, the first and the last, a ring 91 may be provided in which there are no holes or patterns 55. The letter or numeral may, instead, be formed by removing certain of the punches or pins, thereby effecting the same results as if the undesired pins were allowed to retract into the holes formed in the rings 54.

In order to operate the marking device from the exterior of the apparatus, I provide a shaft 92 (Fig. 1) extending to the rear of compartment 7 and mounted in bearings 93 and 94 provided in the walls of the compartments. This shaft 92 is secured to the shaft 59 by any suitable connection as by the coupling 95. The outer end of the shaft 92 is provided with a handle 96 securely fastened thereto as by a pin 97. A collar 95′ is placed in front of the bearing 94 to hold the shaft 92 in place. In order to insure that the mechanism is brought back to its original position, as shown in Fig. 3, spring means, generally indicated at 98, are provided. A cup member 99 is fastened to the shaft 92 as by a set screw 100. The end 101 of cup 99 has a hole therein to receive one end of a torsion spring 102, the other end of which is securely fastened to the wall 103. In order that the marking device may be operated without allowing the interior of the sound recording apparatus to be exposed to light, I provide a shield 104 over the top of the frame 37. The main door 105 of the sound recording apparatus is provided with an inwardly projecting flange 106 as will be seen in Fig. 3. This flange registers with and abuts against the front edge of the shield 104 and the upper edge 107 of the main frame 37. The flange 106 also extends inside of the shield 104 as shown, thereby providing a light-proof compartment which is accessible from the outside. A door 108, hinged to the main door 105, as indicated at 109, is provided for this purpose.

Fig. 6 shows a section of film 9, having on it a series of identifying markings 110. These may be considered as divided into groups. For example, the first three marks (BL1) may identify the name of the picture; the second three marks (234) may identify the number of the scene in that picture, while the last two marks (OA) may identify the number of the take in that scene.

In order to identify the beginning of each

"take" in the dark room, a notch 112 is provided on the edge of the film adjacent the number combination 110 as shown in Fig. 6. It will be seen therefore that the operator has merely to run his fingers along the edge of the film until he feels the notch which identifies not only the beginning of the "take" but also the location of the number combination 110. In order to punch the notch 112 at the same time the number combination is punched, I provide a punch 113 attached to the lower edge of the guide block 41 which is adapted to engage the die 114 provided in the die plate 76. As will be seen in Fig. 5, the die 114 is so situated that the edge of the film 9 lies on the center of it and therefore when the punch is operated, the semicircular notch 112 will be produced.

Having thus described the invention, what is claimed as new and desired to secure by Letters Patent, is:

I claim:

1. A punch for a strip affectable by light, comprising a die plate and a stripper plate disposed in parallel relationship to one another, a plurality of punch members normally extending into said stripper plate and adapted to be inserted in said die plate upon actuation thereof, a light-tight compartment for housing said die plate, stripper plate, and punch members, a plurality of rotatable rings for determining which of said punch members are adapted to simultaneously enter said die plate, means for positioning said rings at any predetermined position, a second compartment for housing said rings and last-mentioned means, access thereto being independent of access to the interior of said first compartment and means for operating said die plate for punching said light-affectable strip interposed between said die plate and stripper plate.

2. A punch in accordance with claim 1 in which means are provided for actuating said last-mentioned means from without said compartments.

3. In combination a housing having a plurality of light-tight compartments, a punch positioned in said compartments, one of said compartments containing a plurality of punch members, a die plate adapted to receive certain of said punch members according to the predetermined setting, a cam member adapted to be operated externally of said compartment, said cam member moving said die member into engagement with said punch members, and means for directing a light-affectable strip between said punch members and said die member, and the other compartment of said film punch containing a plurality of ring members for determining the characters to be punched upon operation of said cam member, said housing being adapted to provide access to the interior of said second-mentioned compartment containing said ring members without exposing to light the interior of said first-mentioned compartment containing said strip.

4. A punching device, comprising a plurality of punch members, a die member, a cam for operating and inserting said punch members in said die member, means for operating said cam member, a plurality of rollers adapted to direct a light-affectable strip through said punch members and said die member, a separate light-tight compartment for said punch members and die member, a plurality of control members for determining the characters to be punched by said punch members and die member, and a separate compartment for housing said control members and for providing access thereto without light exposing said strip between said punch members and said die member.

5. A punching device, comprising a punch member, a movable die member, a cam for inserting said punch member in said die member, means for operating said cam, means adapted to direct a light-affectable strip between said punch member and said die member, a light-tight compartment for said punch member and said die member, means for selecting a character to be punched by said punch member and said die member, and a separate compartment for housing said selecting means and for providing access thereto without exposing the strip between said punch member and said die member to light.

6. A punching device comprising a plurality of punch members, a corresponding plurality of members for selecting the characters to be punched by said punch members, a common die member for all of said punch members, a stripper member, means for inserting said punch members into said die member, means for operating said last-mentioned means, a light-tight compartment for said punch members, said stripper member and said die member, and a separate compartment for said selecting members for controlling the characters to be punched by said punch members.

7. A punching device comprising a punch including punching members, a die member, and concentric character selecting members, a light-tight compartment solely for said punching and die members, means for actuating said punching members, a second compartment for said character selecting members, and means for operating said actuating means.

8. A punching device comprising a plurality of fixed punch members, a corresponding plurality of concentrically movable members for selecting the characters to be punched by said punch members, a light-tight enclosing means for said punch members, a compartment housing said plurality of members for selecting the characters to be punched by said punch members, the interior of said compartment being accessible without exposing said punch members to light, and means for operating said punch members.

ERNEST ROSS.